United States Patent
Aso et al.

(10) Patent No.: US 9,797,447 B2
(45) Date of Patent: Oct. 24, 2017

(54) BEARING FOR VERTICAL AXIS WINDMILL AND VERTICAL AXIS WIND POWER GENERATOR

(71) Applicant: THK CO., LTD., Tokyo (JP)

(72) Inventors: Toshiyuki Aso, Tokyo (JP); Katsuya Iida, Tokyo (JP); Tomoyuki Aida, Tokyo (JP); Yuki Hayashi, Tokyo (JP); Takashi Sakuyama, Tokyo (JP)

(73) Assignee: THK CO., LTD., Tokyo (JP)

( * ) Notice: Subject to any disclaimer, the term of this patent is extended or adjusted under 35 U.S.C. 154(b) by 346 days.

(21) Appl. No.: 14/360,848

(22) PCT Filed: Nov. 28, 2012

(86) PCT No.: PCT/JP2012/080722
§ 371 (c)(1),
(2) Date: May 27, 2014

(87) PCT Pub. No.: WO2013/080998
PCT Pub. Date: Jun. 6, 2013

(65) Prior Publication Data
US 2014/0306459 A1    Oct. 16, 2014

(30) Foreign Application Priority Data
Nov. 29, 2011  (JP) ................. 2011-260317

(51) Int. Cl.
*F16C 33/58* (2006.01)
*F16C 33/32* (2006.01)
(Continued)

(52) U.S. Cl.
CPC ............ *F16C 33/585* (2013.01); *F03D 3/005* (2013.01); *F03D 9/25* (2016.05); *F03D 80/70* (2016.05);
(Continued)

(58) Field of Classification Search
CPC .......... F03D 3/005; F03D 9/002; F03D 80/70; F16C 33/32; F16C 33/585; F16C 19/06;
(Continued)

(56) References Cited

U.S. PATENT DOCUMENTS

| 5,341,569 A | 8/1994 | Takamizawa et al. |
| 2010/0183256 A1* | 7/2010 | Kimura ................. F16C 19/163 384/523 |
| 2011/0248510 A1* | 10/2011 | Yan ......................... F03D 3/005 290/55 |

FOREIGN PATENT DOCUMENTS

| CN | 1284614 A | 2/2001 |
| CN | 101302994 A | 11/2008 |

(Continued)

OTHER PUBLICATIONS

Office Action dated Aug. 28, 2015, issued in counterpart Chinese Patent Application No. 201280058026.0 w/English partial translation (11 pages).

(Continued)

*Primary Examiner* — Atif Chaudry
(74) *Attorney, Agent, or Firm* — Westerman, Hattori, Daniels & Adrian, LLP

(57) ABSTRACT

In a bearing for vertical axis windmill configured to rotatably support a vertical axis of a vertical axis windmill, the bearing includes a ball (7), a diameter of the ball and a curvature of a rolling groove of the bearing are set to satisfy a predetermined starting torque and a load rating. For example, the curvature of the rolling groove of the bearing is 54% or more and 100% or less, and the diameter of the ball has a ratio of 20% or less with respect to a vertical shaft (2).

11 Claims, 5 Drawing Sheets

(51) Int. Cl.
  *F16C 19/06* (2006.01)
  *F03D 3/00* (2006.01)
  *F03D 9/25* (2016.01)
  *F03D 80/70* (2016.01)

(52) U.S. Cl.
  CPC ......... *F16C 33/32* (2013.01); *F05B 2240/211* (2013.01); *F16C 19/06* (2013.01); *F16C 2240/76* (2013.01); *F16C 2300/14* (2013.01); *F16C 2360/31* (2013.01); *Y02E 10/722* (2013.01); *Y02E 10/74* (2013.01)

(58) Field of Classification Search
  CPC ............... F16C 2300/14; F16C 2240/76; F05B 2240/211
  See application file for complete search history.

(56) References Cited

FOREIGN PATENT DOCUMENTS

| | | |
|---|---|---|
| JP | 06-221326 A | 8/1994 |
| JP | 2001-50266 A | 2/2001 |
| JP | 2004-124953 A | 4/2004 |
| JP | 2004-270792 A | 9/2004 |
| JP | 2004-316816 A | 11/2004 |
| JP | 2006-207374 A | 8/2006 |
| JP | 2006-214456 A | 8/2006 |
| JP | 2011-028663 A | 10/2011 |
| JP | 5509183 B2 | 6/2014 |
| TW | 201104071 A | 2/2011 |
| WO | 2005/095794 A1 | 10/2005 |
| WO | 2005/111415 A1 | 11/2005 |

OTHER PUBLICATIONS

Extended European Search Report dated Oct. 23, 2015, issued in counterpart European Patent Application No. 12853037.5 (7 pages).
Japanese Office Action dated Aug. 5, 2014, issued in corresponding Japanese Application No. 2013-193190; w/ English translation. (8 pages).
"Boundary Dimensions of Rolling Bearings", B1512-1975; with partial English translation.
International Search Report, dated Jan. 15, 2013, issued in corresponding application No. PCT/JP2012/080722.
"Boundary Demensions of Rolling Bearings", B1512-1975; with partial English translation.
Office Action dated Jul. 6, 2015, issued in counterpart Taiwanese Patent Application No. 101144834, with English translation (9 pages).

* cited by examiner

FIG. 3
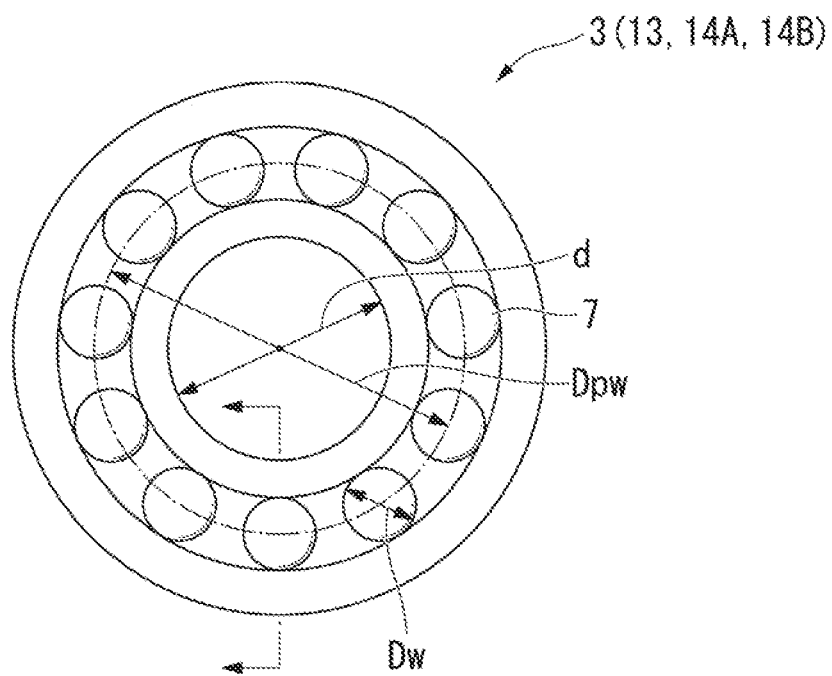
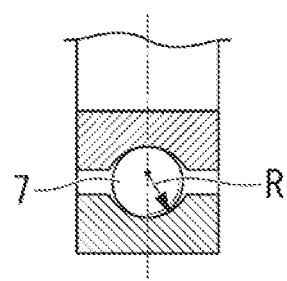

BEARING FOR VERTICAL AXIS WINDMILL AND VERTICAL AXIS WIND POWER GENERATOR

TECHNICAL FIELD

The present invention relates to a bearing for a vertical axis windmill and a vertical axis wind power generator.

Priority is claimed on Japanese Patent Application No. 2011-260317, filed Nov. 29, 2011, the content of which is incorporated herein by reference.

BACKGROUND ART

As a vertical axis fluid power generator configured to perform power generation using a flow of a fluid, for example, a wind power generator using a flow of wind (a working fluid) has been developed. Such a vertical axis wind power generator includes a axis body, a plurality of blades (a windmill), a support body, and a power generator.

The plurality of blades are arranged around a central axis of the axis body at intervals and connected to the axis body. The support body rotatably supports the axis body around the central axis via a bearing. The power generator converts mechanical energy obtained as the axis body rotates in a circumferential direction into electrical energy, generating electric power.

For example, in a wind power generator disclosed in Patent Literature 1, a rotary mechanism (an axis body) to which vertical wings (blades) are connected extends in a direction perpendicular to the ground (a direction perpendicular to a horizontal plane). The rotary mechanism is rotatably supported with respect to an intermediate fixed axis (a support body) via a pair of bearings (ball bearings).

CITATION LIST

Patent Literature

[Patent Literature 1] Japanese Unexamined Patent Application, First Publication No. 2006-207374

SUMMARY OF INVENTION

Technical Problem

However, in a vertical wind power generator of the related art, there are problems as described below. The axis body is set to a diameter needed for securing strength. Then, a commercially available ball bearing such as 70XX or the like (JIS B 1512) is selected to correspond to the diameter of the axis body. However, in the ball bearing selected as described above, a load rating is excessively increased (over engineered). In addition, since a load capacity (a dynamic load rating or a static load rating) of the ball bearing is also large, a torque resistance is also increased. For this reason, power generation efficiency may be decreased by interference with rotation of the axis body (in particular, rotation in a low wind speed area), and efficiency of the windmill may be degraded.

The present invention provides a bearing for vertical axis windmill and a vertical axis wind power generator that are capable of reducing torque resistance, smoothly rotating an axis body, and increasing power generation efficiency.

Solution to Problem

According to a first aspect of the present invention, a bearing for vertical axis windmill configured to rotatably support a vertical axis of a vertical axis windmill, and the bearing includes a ball, a diameter of the ball and a curvature of a rolling groove of the ball are set to satisfy a predetermined starting torque and a load rating.

According to a second aspect of the present invention, in the bearing for vertical axis windmill according to the first aspect, the curvature of the rolling groove is 54% or more and 100% or less.

According to a third aspect of the present invention, in the bearing for vertical axis windmill according to the first or second aspect, the diameter of the ball has a ratio of 20% or less with respect to the vertical axis.

According to a fourth aspect of the present invention, in the bearing for vertical axis windmill according to any one of the first to third aspects, the rolling groove of the ball is formed in an outer circumferential surface of the vertical axis.

According to a fifth aspect of the present invention, a vertical axis wind power generator includes: a windmill configured to rotate around a central axis extending in a vertical direction; an axis body configured to be disposed along the central axis and to be connected with the windmill; a support body configured to rotatably support the axis body around the central axis via a bearing; and a power generator configured to generate electric power by rotation of the axis body, and the bearing is the bearing according to any one of the first to four aspects.

Advantageous Effects of Invention

According to the present invention, the bearing for a vertical axis windmill and the vertical axis wind power generator that are capable of reducing torque resistance, smoothly rotating the axis body and increasing power generation efficiency can be realized.

BRIEF DESCRIPTION OF DRAWINGS

FIG. 3 is a view showing a bearing according to the first embodiment of the present invention.

DESCRIPTION OF EMBODIMENTS (First Embodiment)

Figure 1:
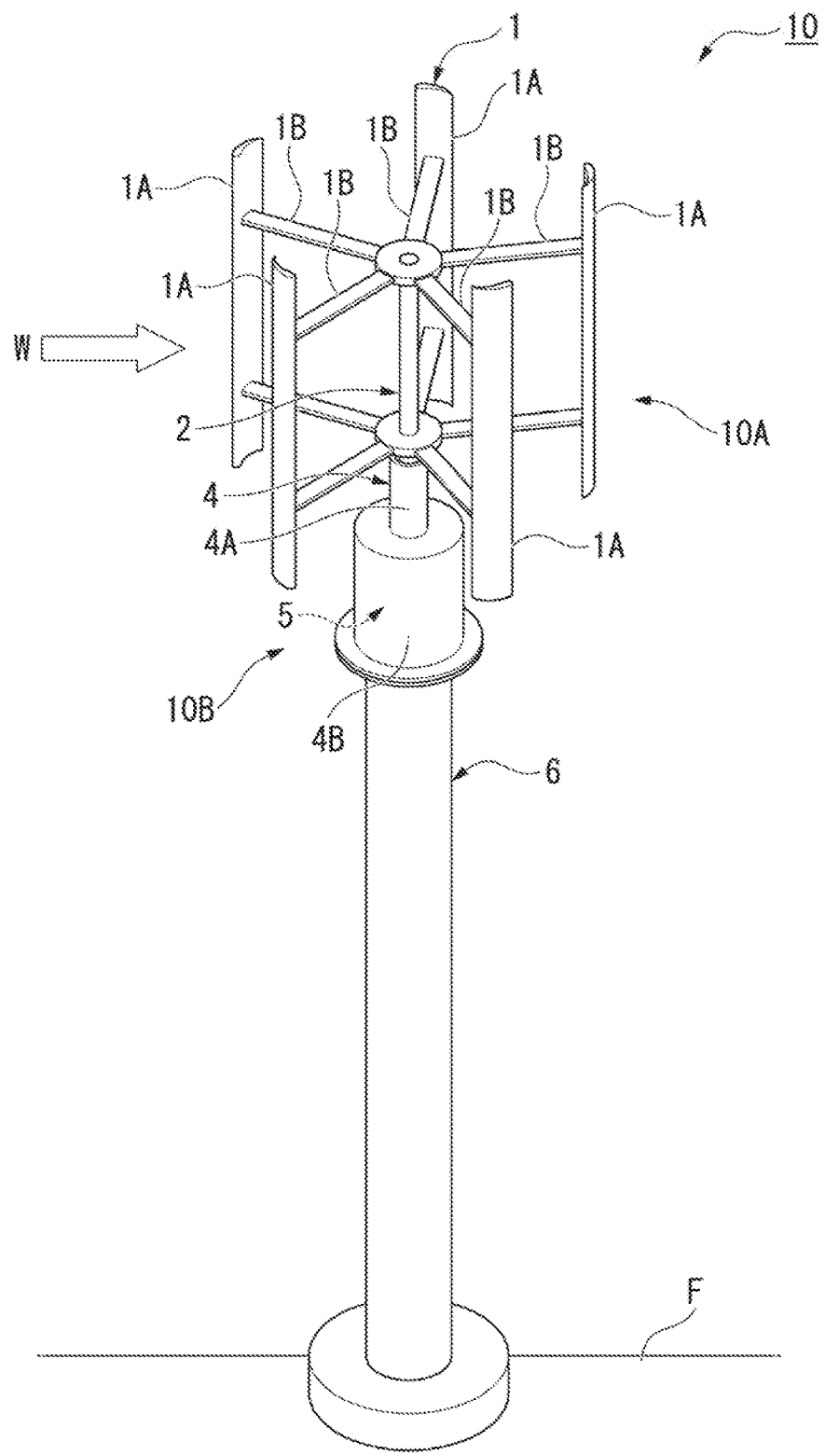
FIG. 1 is an appearance view showing a vertical axis wind turbine generator according to a first embodiment of the present invention.
Figure 2:
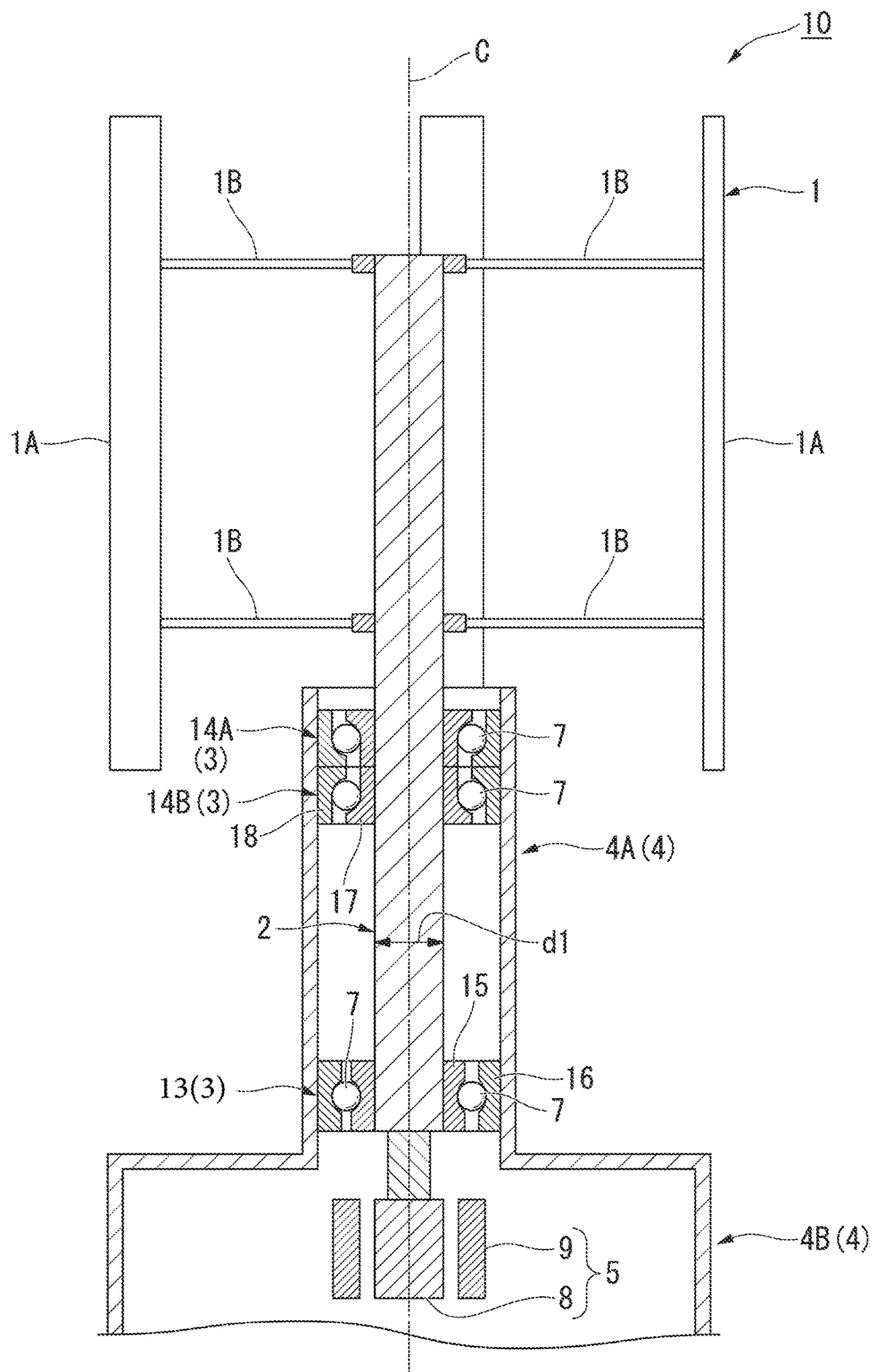
FIG. 2 is a side cross-sectional view showing the vertical axis wind power generator according to the first embodiment of the present invention.

FIG. 1 is an appearance view showing a vertical axis wind power generator 10 according to a first embodiment. FIG. 2 is a side cross-sectional view showing the vertical axis wind power generator 10.

As shown in FIGS. 1 and 2, the vertical axis wind power generator (the vertical axis fluid power generator) 10 has a rotary mechanism 10A configured to be rotated by receiving wind (a working fluid) W, and a power generation mechanism 10B configured to convert mechanical energy obtained by the rotary mechanism 10A into electrical energy.

The rotary mechanism 10A includes a windmill 1 configured to receive the wind W, a rotary axis (an axis body) 2 connected to the windmill 1, and a casing (a support body) 4 configured to rotatably support the rotary axis 2 around a central axis C via a bearing 3.

The power generation mechanism 10B includes a power generator 5 configured to convert mechanical energy obtained as the rotary axis 2 rotates in a circumferential direction (around the central axis C) into electrical energy to generate electric power.

The rotary mechanism 10A and the power generation mechanism 10B are disposed on a tower (a post) 6 standing on the ground F and extending in the vertical direction.

The windmill 1 is a so-called gyro mill type windmill. The windmill 1 has a plurality of blades 1A formed in a rectangular plate shape or a strip shape and extending in the vertical direction. The plurality of blades 1A are disposed around the central axis C of the rotary axis 2 at equal intervals in the circumferential direction. The plurality of blades 1A are connected to the rotary axis 2 via a plurality of arms 1B configured to support the plurality of blades 1A.

The blade 1A is formed in a shape to generate lift force when the blade 1A receives the wind W. The windmill 1 is rotated around the central axis C of the rotary axis 2 by the lift force.

The windmill 1 has independent on a wind direction. The windmill 1 is set to be rotatable around the central axis C of the rotary axis 2 with respect to the wind W in all directions.

As shown in FIG. 2, the rotary axis 2 to which the windmill 1 (the blade 1A) is connected extends in the vertical direction such that the central axis C is perpendicular to the ground F. The rotary axis 2 is rotatably axially supported with respect to the casing 4 via the bearing 3.

A first end of the arm 1B having a rectangular shape or a strip shape is connected to an outer circumferential surface of the rotary axis 2. The arms 1B protrude outward in the radial direction. The arms 1B are disposed in the circumferential direction of the rotary axis 2 at equal intervals. Then, the blade 1A is connected to a second end of the arm 1B. The pair of arms 1B are installed at one blade 1A in parallel in the central axis C direction.

The rotary axis 2 is rotatably supported with respect to the casing 4 as the bearings 3 are installed in the vicinity of a central section and a lower end section thereof. The bearings 3 are constituted by a radial bearing 13 which are spaced apart from each other in the central axis C direction of the rotary axis 2 and a double row of angular bearings 14A and 14B.

The radial bearing 13 is disposed at an end section near the power generator 5 of the central axis C direction in the rotary axis 2. An inner rim 15 of the radial bearing 13 is fixed to a lower end side of the rotary axis 2.

The double row of angular bearings 14A and 14B are disposed at a side near the windmill 1 of the central axis C direction in the rotary axis 2. Inner rims 17 and 17 of the double row of angular bearings 14A and 14B are fixedly installed at a central section of the rotary axis 2.

The casing 4 is formed in a multi-stage tubular shape in which an upper portion 4A near the windmill 1 (a first end side) has a diameter smaller than that of a lower portion 4B near a tower 6 (a second end side) opposite to the windmill 1. A lower end section of the lower portion 4B of the casing 4 is connected to an upper end section of the tower 6.

Outer rims 18 of the angular bearings 14A and 14B are fixed to an upper end side of an inner circumferential surface of the upper portion 4A of the casing 4. An outer rim 16 of the radial bearing 13 is fixed to a lower end side of an inner circumferential surface of the upper portion 4A of the casing 4.

The radial bearing 13 and the angular bearings 14A and 14B of the bearings 3 have a plurality of balls 7 having the same diameter.

Vertical positions of the radial bearing 13 and the angular bearings 14A and 14B may be set to be opposite to those described above. The radial bearing 13 may be disposed at a side near the windmill 1 of the rotary axis 2, and the angular bearings 14A and 14B may be disposed at a side near the power generator 5 of the rotary axis 2.

The angular bearings 14A and 14B may be disposed in front alignment or parallel alignment rather than rear alignment.

The power generator 5, a controller (not shown), and so on, are accommodated in the lower portion 4B of the casing 4.

The power generator 5 is configured to convert a rotational force (mechanical energy) obtained by rotation of the rotary axis 2 into electrical energy to generate electric power. The power generator 5 includes a magnet rotor 8 connected to a lower end of the rotary axis 2 and rotated with the rotary axis 2, and a coil stator 9 disposed to surround an outer circumferential side of the magnet rotor 8.

When the windmill 1 receives the wind W to rotate the rotary axis 2 around the central axis C, the magnet rotor 8 connected to the rotary axis 2 is also rotated around the central axis C. The magnet rotor 8 rotates concentrically with the windmill 1 and the rotary axis 2 (around the central axis C).

As the magnet rotor 8 rotates around the central axis C with respect to the coil stator 9, electromagnetic induction is generated between the magnet rotor 8 and the coil stator 9, and then electric power is generated.

Required performance of the bearing 3 configured to axially support the rotary axis 2 will be described in detail.

FIG. 3 is a view showing the bearing 3 according to the first embodiment.

The rotary axis 2 of the vertical axis wind turbine generator 10 may be efficiently and easily rotated. The bearing 3 used for the rotary axis 2 needs to axially support the rotary axis 2 to rotate even when the windmill 1 receives the wind W having a low wind speed. For this reason, the bearings 3 (the radial bearing 13 and the angular bearings 14A and 14B) require that starting torque and rotational torque be extremely low.

Meanwhile, the bearing 3 configured to axially support the rotary axis 2 should have performance such that a sufficient static load capacity (basic static load rating) and dynamic load capacity (basic dynamic load rating) are satisfied, because the bearing 3 receives an external force having large variation (the wind W received by the windmill 1) for a long time.

Therefore, the bearing 3 should have a low rotational torque while having a sufficient load rating.

In a specification (performance) of the bearing 3, the following four parameters are known as shape parameters for determining rotational torque and load ratings (a basic static load rating and a basic dynamic load rating).

(1) A ball diameter Dw
(2) A rolling contact groove curvature $\alpha$ ($\alpha=R/Dw$, rolling contact groove radius R)
(3) A ball center diameter Dpw
(4) The number of balls z In general, when numerical values of (1), (3) and (4) are increased, the rotational torque and the load ratings are also increased. Meanwhile, it is known that, when a numerical value of (2) is increased, the rotational torque and the load ratings are decreased.

For this reason, balance of these four parameters is important.

A diameter d1 of the rotary axis 2 is substantially consequently determined (a necessary minimum diameter or more) from conditions (working conditions) such as maximum wind power or the like received by the windmill 1. An inner diameter d of the bearing 3 is approximately consequently determined, because the inner diameter d is the same as the diameter d1 of the rotary axis 2.

When the inner diameter d of the bearing 3 is determined, (3) the ball center diameter Dpw is derived by determining (1) the ball diameter Dw.

(4) The number of balls z is derived by determining (1) the ball diameter Dw and (3) the ball center diameter Dpw. This is because a maximum number of balls B that can be disposed on a trajectory is physically determined. When the number of balls z is reduced, since a load per ball B is increased and reliability decreased, reduction in the number of balls is not practical.

As a result, it will be understood that, when an optimal bearing 3 is to be designed (employed) in the rotary axis 2 of the windmill 1, two parameters of (1) the ball diameter Dw and (2) the rolling contact groove curvature α of the bearing become important parameters.

Accordingly, in order to cause the bearing 3 to have a sufficient load capacity and a low rotational torque, the bearing 3 should satisfy the following conditions.

(Condition 1) The ball diameter Dw is reduced.

(Condition 2) The rolling contact groove curvature α of the bearing is increased.

Design (employment) of the bearing 3 that satisfies the above-mentioned conditions is performed in the following sequence.

First, performance required for the bearing 3 configured to axially support the rotary axis 2 is obtained from a specification (working conditions) of the windmill 1. Load ratings (a basic dynamic load rating and a basic static load rating) and starting torque required for the bearing 3 are obtained.

Next, a relation curve that can satisfy the obtained required performance (the basic dynamic load rating, the basic static load rating and the starting torque) is obtained. That is, a relation (a relation curve) between (1) the ball diameter Dw and (2) the rolling contact groove curvature α of the bearing is obtained.

Figure 4:
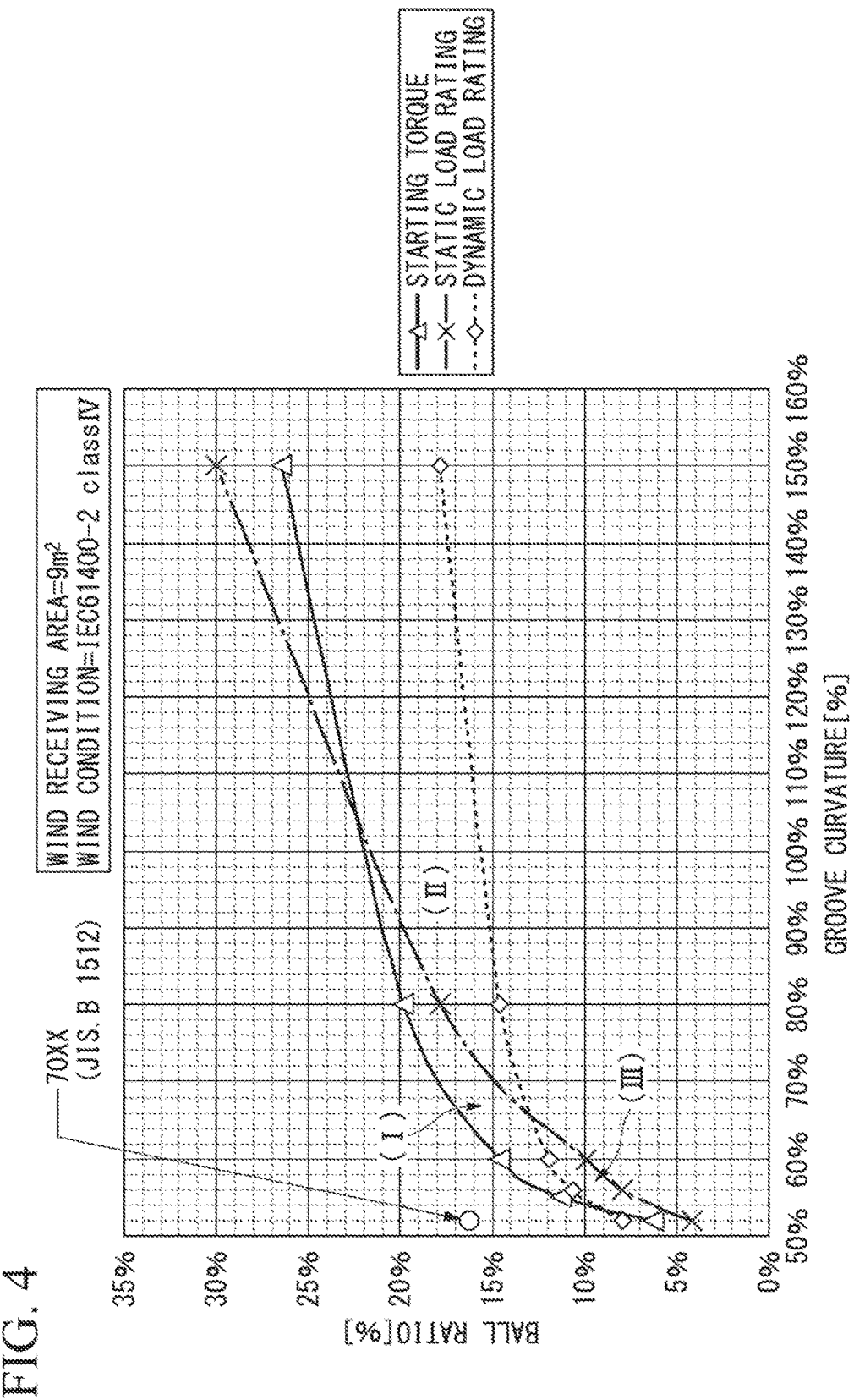
FIG. 4 is a graph showing a relation curve between a curvature of a rolling groove and a ball ratio satisfying required performance of the bearing.

FIG. 4 is a graph showing the relation curve between the ball ratio β and the rolling contact groove curvature α in order to cause the bearing 3 to satisfy the required performance. FIG. 4 shows the case in which a wind receiving area of the windmill 1 is 9 m². The wind condition is IEC61400-2 class IV.

In IEC61400-2, a windmill having a wind receiving area of 2 m² to less than 200 m² is referred to as a small windmill.

In FIG. 4, a vertical axis represents a ball ratio β, and a horizontal axis represents a rolling contact groove curvature α of the bearing. The vertical axis shows a ratio (the ball ratio β) of the ball diameter Dw with respect to the diameter d1 of the rotary axis 2, not the ball diameter Dw itself represented by (1) above. Since the diameter d1 of the rotary axis 2 should not be limited to be designed to a necessary minimum dimension, the ball ratio β is used.

The ball ratio β=Dw/d (the ball diameter Dw, the rotary axis diameter d)

As described above, the bearing 3 should satisfy the load rating and the starting torque. The bearing 3 should satisfy at least one of the basic dynamic load rating and the basic static load rating, and further satisfy the starting torque. More preferably, the bearing 3 is desired to satisfy all of the basic dynamic load rating, the basic static load rating and the starting torque.

In the case shown in FIG. 4, it can be understood that, as long as (1) the ball diameter Dw and (2) the rolling contact groove curvature α of the bearing are plotted in a region I, a region II and a region III, the bearing 3 is appropriate as a bearing used for the rotary axis 2 of the vertical axis wind power generator 10.

Further, in the bearing 3, it is appropriate that (1) the ball diameter Dw and (2) the rolling contact groove curvature α be plotted in the region I. (1) The ball diameter Dw is about 20% or less. Preferably, (1) the ball diameter Dw is 10% to 15%. (2) The rolling contact groove curvature α is 54% to 100%. Preferably, (2) the rolling contact groove curvature α is 55% to 65%.

For example, a bearing having a rolling contact groove curvature α=60% and a ball ratio β=12% may be designed (employed) as the bearing 3.

When the ball diameter Dw exceeds 20%, it is difficult to satisfy both of the load rating and the starting torque. When the ball diameter Dw is excessively larger than the diameter of the rotary axis 2, the number of balls 7 to be disposed in the bearing 3 is reduced, and a load applied to each of the balls 7 becomes excessive, which is not practical.

In general, the ball having an excessively small or large diameter (in particular, a diameter of 1 inch or more) has low marketability and increases cost. For this reason, the ball diameter Dw of 20% or less is appropriate.

When the ball diameter Dw is less than 10%, it is difficult to satisfy both of the load rating and the starting torque. For this reason, the ball diameter Dw of 10% or more is appropriate.

When the rolling contact groove curvature α of the bearing is less than 54%, similar to the case in which the ball diameter Dw is 10% or less, it is difficult to satisfy both of the load rating and the starting torque. For this reason, the rolling contact groove curvature α of the bearing of 54% or more is appropriate.

When the rolling contact groove curvature α of the bearing exceeds 100%, similar to the case in which the ball diameter Dw exceeds 20%, it is difficult to satisfy both of the load rating and the starting torque. For this reason, the rolling contact groove curvature α of the bearing of 100% or less is appropriate.

As described above, in the vertical axis wind power generator 10 according to the first embodiment, the bearing 3 has a sufficient load rating and a small rotational torque, because (1) the ball diameter Dw is small and (2) the rolling contact groove curvature α of the bearing is large. Therefore, even when the windmill 1 receives the wind W having a very low wind speed, the rotary axis 2 can be rotated.

In addition, the windmill 1 can receive an external force (the wind W received by the windmill 1) having a large variation for a long time. Accordingly, the vertical axis wind power generator 10 can generate power with high efficiency.

(Second Embodiment)

Figure 5:
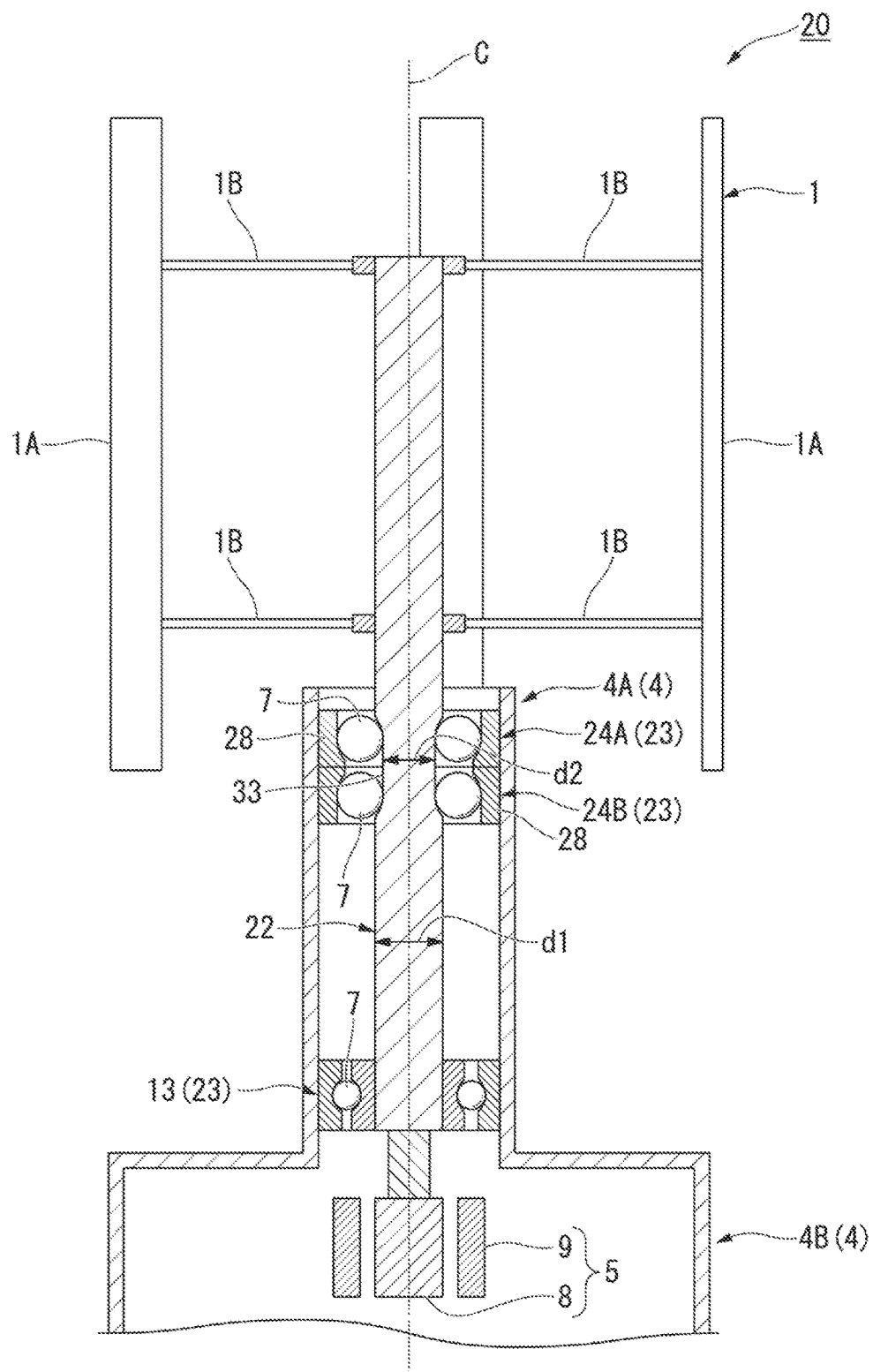
FIG. 5 is a side cross-sectional view showing a vertical axis wind power generator and a bearing according to a second embodiment of the present invention.

FIG. 5 is a side cross-sectional view showing a vertical axis wind power generator 20 and a bearing 23 according to a second embodiment.

The second embodiment will be described focusing on differences from the vertical axis wind power generator 10 and the bearing 3 according to the first embodiment, and description of the same members or the like as the vertical axis wind power generator 10 and the bearing 3 will be omitted.

A rotary axis 22 of the vertical axis wind power generator 20 is axially supported by the bearing 23. The bearing 23 includes the above-mentioned radial bearing 13 and angular bearings 24A and 24B.

In the rotary axis 22 to which the windmill 1 is connected, a rolling contact groove 33 in which the plurality of balls 7 roll in contact therewith are formed at a portion in which the double row of angular bearings 24A and 24B are installed. The angular bearings 24A and 24B have only outer rims 28 and have no inner rim. For this reason, a rolling contact groove 33 in which the balls 7 roll in contact therewith is formed at an outer circumferential surface of the rotary axis 22.

The rolling contact groove 33 is formed in an annular shape extending in a circumferential direction in an outer circumferential surface of the rotary axis 22. The rolling contact groove 33 is formed in a semi-circular shape recessed toward the central axis C.

Vertical positions of the radial bearing 13 and the angular bearings 24A and 24B may be set to be opposite to the above-mentioned type. The radial bearing 13 may be disposed at a side near the windmill 1 of the rotary axis 2 and the angular bearings 24A and 24B may be disposed at a side near the power generator 5 of the rotary axis 2.

The angular bearings 24A and 24B may be disposed in front alignment or parallel alignment rather than rear alignment.

Required performance of the bearing 23 configured to axially support the rotary axis 22 is the same as that of the bearing 3. Therefore, design (employment) of the bearing 23 that satisfies the above-mentioned condition may be formed in the same sequence as that of the bearing 3.

However, in the radial bearing 13 and the angular bearings 24A and 24B, since an inner diameter d, a ball diameter Dw, a rolling contact groove radius R, a ball center diameter Dpw, and the number of balls z are different, the bearings should be individually designed (employed). For example, the inner diameter d of the angular bearings 24A and 24B is not the diameter d1 of the rotary axis 22 but becomes a diameter d2 of a portion thereof in which the rolling contact groove 33 is formed.

Even in the vertical axis wind power generator 20 according to the second embodiment, the bearing 23 has a sufficient load rating and a small rotational torque, because (1) the ball diameter Dw is reduced and (2) the rolling contact groove curvature α is increased. Therefore, even when the windmill 1 receives the wind W having a very small wind speed, the rotary axis 22 can be rotated. In addition, the windmill 1 can receive an external force (the wind W received by the windmill 1) having a large variation for a long time. Accordingly, the vertical axis wind turbine generator 20 can generate power with high efficiency.

The shapes or combinations shown in the above-mentioned embodiment are merely exemplary, and various modifications may be made based on design requirements without departing from the scope of the present invention.

The radial bearing may have no inner rim, and a rolling contact groove may be formed in the rotary axis 22.

The radial bearing and the angular bearing may have only the inner rim and have no outer rim, and a rolling contact groove may be formed at an inner circumferential surface of the casing 4 (the upper portion 4A).

The rotary axis 2 or 22 is not limited to an integrated structure but a plurality of axis members may be connected;

The pair of arms 1B may be spaced apart from each other in the central axis C direction and may not be parallel.

The ball diameters of the radial bearing 13 of the bearings 3 and 23 and the angular bearings 14A, 14B, 24A and 24B may have the same diameter or different diameters.

REFERENCE SIGNS LIST

1 . . . windmill
2 . . . rotary axis (axis body)
3 . . . bearing (bearing for vertical axis windmill)
4 . . . casing (support body)
5 . . . power generator
7 . . . ball
10 . . . vertical axis wind power generator
13 . . . radial bearing
14A, 14B . . . angular bearing
20 . . . vertical axis wind power generator
22 . . . rotary axis (axis body)
23 . . . bearing (bearing for vertical axis windmill)
24A, 24B . . . angular bearing
33 . . . rolling contact groove
C . . . central axis

The invention claimed is:

1. A method of manufacturing a, bearing for a vertical axis windmill, the bearing comprising a bail rolling on a rolling contact groove and being configured to rotatably support a vertical axis of a vertical axis windmill, the method comprising:
   defining a ratio of a diameter of the ball with respect to a diameter of the vertical axis as a ratio;
   defining a numerical value that is obtained by dividing a rolling contact groove radius by the diameter of the ball as a numerical value;
   using a graph which represents the ratio as a vertical axis and represents the numerical value as a horizontal axis, and which includes an area surround by a first relation curve, a second relation curve, and a third relation curve,
   the first relation curve showing a relation between the ratio and the numerical value and showing a starting torque obtained from working conditions of the vertical axis windmill,
   the second relation curve showing a relation between the ratio and the numerical value and showing a dynamic load rating obtained from working conditions of the vertical axis windmill,
   the third relation curve showing a relation between the ratio and the numerical value and showing a static load rating obtained from working conditions of the vertical axis windmill;
   determining the ratio within the area as a specified ratio;
   determining the numerical value within the area as a specified numerical value; and
   manufacturing the bearing by use of the specified ratio and the specified numerical value.

2. The method of manufacturing the bearing for a vertical axis windmill according to claim 1, wherein the specified numerical value that is obtained by dividing the rolling contact groove radius by the diameter of the ball is determined to be 54% or more and 100% or less.

3. The method of manufacturing bearing for a vertical axis windmill according to claim 2, wherein the diameter of the ball has a ratio of 20% or less with respect to the diameter of the vertical axis.

4. The method of manufacturing bearing for a vertical axis windmill according to claim 2, wherein the rolling groove of the ball is formed in an outer circumferential surface of the vertical axis.

5. A method of manufacturing a vertical axis wind power generator, the vertical axis wind power generator comprising:
- a windmill configured to rotate around a central shaft extending in a vertical direction;
- an axis body configured to be disposed along the central axis and to be connected with the windmill;
- a support body configured to rotatably support the axis body around the central axis via a bearing for a vertical axis windmill; and
- a power generator configured to generate electric power by rotation of the axis body, the method comprising:
- manufacturing the bearing by the method according to claim 2.

6. The method of manufacturing bearing for a vertical axis windmill according to claim 1, wherein the diameter of the ball has a ratio of 20% or less with respect to the diameter of the vertical axis.

7. The method of manufacturing bearing for a vertical axis windmill according to claim 6, wherein the rolling groove of the ball is formed in an outer circumferential surface of the vertical axis.

8. A method of manufacturing a vertical axis wind power generator, the vertical axis wind power generator comprising:
- a windmill configured to rotate around a central shaft extending in a vertical direction;
- an axis body configured to be disposed along the central axis and to be connected with the windmill;
- a support body configured to rotatably support the axis body around the central axis via a bearing for a vertical axis windmill; and
- a power generator configured to generate electric power by rotation of the axis body,
- the method comprising:
- manufacturing the bearing by the method according to claim 6.

9. The method of manufacturing bearing for a vertical axis windmill according to claim 1, wherein the rolling groove of the ball is formed in an outer circumferential surface of the vertical axis.

10. A method of manufacturing a vertical axis wind power generator, the vertical axis wind power generator comprising:
- a windmill configured to rotate around a central shaft extending in a vertical direction;
- an axis body configured to be disposed along the central axis and to be connected with the windmill;
- a support body configured to rotatably support the axis body around the central axis via a bearing for a vertical axis windmill; and
- a power generator configured to generate electric power by rotation of the axis body,
- the method comprising:
- manufacturing the bearing by the method according to claim 9.

11. A method of manufacturing a vertical axis wind power generator, the vertical axis wind power generator comprising:
- a windmill configured to rotate around a central shaft extending in a vertical direction;
- an axis body configured to be disposed along the central axis and to be connected with the windmill;
- a support body configured to rotatably support the axis body around the central axis via a bearing for a vertical axis windmill; and
- a power generator configured to generate electric power by rotation of the axis body,
- the method comprising:
- manufacturing the bearing by the method according to claim 1.

* * * * *